United States Patent
Goncharov et al.

(10) Patent No.: US 10,923,145 B2
(45) Date of Patent: *Feb. 16, 2021

(54) MICROWAVE-ASSISTED MAGNETIC RECORDING (MAMR) WRITE HEAD WITH COMPENSATION FOR DC SHUNTING FIELD

(71) Applicant: Western Digital Technologies, Inc., San Jose, CA (US)

(72) Inventors: Alexander Goncharov, Morgan Hill, CA (US); Muhammad Asif Bashir, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/835,198

(22) Filed: Mar. 30, 2020

(65) Prior Publication Data

US 2020/0227076 A1 Jul. 16, 2020

Related U.S. Application Data

(63) Continuation of application No. 16/276,466, filed on Feb. 14, 2019, now Pat. No. 10,636,441, which is a
(Continued)

(51) Int. Cl.
*G11B 5/31* (2006.01)
*G11B 5/35* (2006.01)
(Continued)

(52) U.S. Cl.
CPC .................. *G11B 5/35* (2013.01); *G11B 5/11* (2013.01); *G11B 5/1278* (2013.01); *G11B 5/23* (2013.01);
(Continued)

(58) Field of Classification Search
None
See application file for complete search history.

(56) References Cited

U.S. PATENT DOCUMENTS

| 7,982,996 B2 | 7/2011 | Smith et al. |
| 8,582,240 B1 | 11/2013 | Chen et al. |
| (Continued) | | |

FOREIGN PATENT DOCUMENTS

| CN | 104835510 B | 11/2017 |
| JP | 2013251042 A | 12/2013 |
| WO | 2015126326 A1 | 8/2015 |

OTHER PUBLICATIONS

J.G. Zhu et al., "Microwave Assisted Magnetic Recording", IEEE Transactions on Magnetics, vol. 44, No. 1, Jan. 2008, pp. 125-131.
(Continued)

*Primary Examiner* — Jefferson A Evans
(74) *Attorney, Agent, or Firm* — Patterson & Sheridan, LLP; Steven H. Versteeg

(57) ABSTRACT

A microwave-assisted magnetic recording (MAMR) write head has a spin-torque oscillator (STO) and a ferromagnetic compensation layer between the write pole and trailing shield. The compensation layer is separated from a free layer by a nonmagnetic barrier layer that prevents spin-polarized electrons from the free layer from reaching the compensation layer. The compensation layer may be located between the write pole and the free layer. Electrons become spin-polarized by the compensation layer and are reflected back from the write pole across a nonmagnetic spacer layer. This causes the magnetization of the compensation layer to flip and become antiparallel to the magnetization of the free layer. The compensation layer thus generates a DC offset field that compensates for the negative effect of the DC shunting field from the free layer.

17 Claims, 7 Drawing Sheets

Related U.S. Application Data continuation of application No. 15/722,217, filed on Oct. 2, 2017, now abandoned.

(51) Int. Cl.
| | |
|---|---|
| *G11B 5/39* | (2006.01) |
| *G11B 5/60* | (2006.01) |
| *G11B 5/127* | (2006.01) |
| *G11B 5/11* | (2006.01) |
| *G11B 5/23* | (2006.01) |
| *G11B 5/00* | (2006.01) |

(52) U.S. Cl.
CPC .............. *G11B 5/314* (2013.01); *G11B 5/315* (2013.01); *G11B 5/399* (2013.01); *G11B 5/6082* (2013.01); *G11B 2005/0024* (2013.01)

(56) References Cited

U.S. PATENT DOCUMENTS

| | | | |
|---|---|---|---|
| 8,687,319 B2 | 4/2014 | Igarashi et al. | |
| 8,970,996 B2 | 3/2015 | Nagasaka et al. | |
| 9,099,107 B1 | 8/2015 | Igarashi et al. | |
| 9,105,279 B2 | 8/2015 | Shiroishi | |
| 9,230,571 B1 | 1/2016 | Chen et al. | |
| 9,275,672 B2 | 3/2016 | Shiroishi et al. | |
| 9,305,574 B1 | 4/2016 | Nagasaka et al. | |
| 9,355,657 B1 | 5/2016 | Aoyama et al. | |
| 9,368,135 B2 | 6/2016 | Gao | |
| 9,406,315 B2 | 8/2016 | Shiimoto et al. | |
| 9,495,983 B2 | 11/2016 | Soeno et al. | |
| 9,881,637 B1 | 1/2018 | Wilson et al. | |
| 10,121,497 B1 | 11/2018 | Takahashi et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 2008/0304176 A1 | 12/2008 | Takagishi et al. | |
| 2009/0059423 A1 | 3/2009 | Yamada et al. | |
| 2009/0310244 A1 | 12/2009 | Shimazawa et al. | |
| 2011/0134561 A1 | 6/2011 | Smith et al. | |
| 2011/0279921 A1* | 11/2011 | Zhang | G11C 11/161 360/59 |
| 2013/0250456 A1 | 9/2013 | Yamada et al. | |
| 2014/0036387 A1 | 2/2014 | Sato et al. | |
| 2014/0104724 A1* | 4/2014 | Shiroishi | G11B 5/7325 360/75 |
| 2014/0139952 A1 | 5/2014 | Takeo et al. | |
| 2014/0146420 A1 | 5/2014 | Shimizu et al. | |
| 2014/0177100 A1 | 6/2014 | Sugiyama et al. | |
| 2015/0103431 A1 | 4/2015 | Igarashi et al. | |
| 2015/0228295 A1* | 8/2015 | Shiimoto | G11B 5/1278 360/125.31 |
| 2015/0310881 A1 | 10/2015 | Koui | |
| 2016/0027455 A1 | 1/2016 | Kudo et al. | |
| 2016/0086623 A1* | 3/2016 | Nagasaka | G11B 5/3146 360/125.3 |
| 2016/0148627 A1 | 5/2016 | Nagasaka et al. | |
| 2016/0218728 A1 | 7/2016 | Zhu | |
| 2017/0148474 A1* | 5/2017 | Okamura | G11B 5/235 |
| 2017/0186450 A1 | 6/2017 | Yamada et al. | |
| 2017/0236537 A1 | 8/2017 | Murakami et al. | |
| 2017/0309301 A1 | 10/2017 | Takahashi et al. | |
| 2018/0005651 A1 | 1/2018 | Sato et al. | |
| 2018/0025746 A1 | 1/2018 | Okamura et al. | |
| 2018/0061450 A1 | 3/2018 | Tabata et al. | |
| 2018/0268848 A1 | 9/2018 | Narita et al. | |
| 2019/0088274 A1 | 3/2019 | Narita et al. | |
| 2019/0094315 A1 | 3/2019 | Inubushi et al. | |
| 2020/0312354 A1* | 10/2020 | Wu | G11B 5/3143 |

OTHER PUBLICATIONS

Wong, H_S_ et al., "Reduction of magnetic damping and isotropic oercivity and increase of saturation magnetization in Rh-incorporated Colr system", 2016 Nanotechnology 27 455705 https://doi.org,'10.1088/0957-4484/27 I 451455 705.

Kitiel C., "On the Theory of Ferromagnetic Resonance Absorption", Phys. Rev. 73, pp. 155-161 (1948).

Mallary, Mike et al.; "Head and Media Challenges for 3 Tb/in2 Microwave-Assisted Magnetic Recording", IEEE Transactions on Magnetics, vol. 50, No. 7, Jul. 2014 (8 pages).

\* cited by examiner

MICROWAVE-ASSISTED MAGNETIC RECORDING (MAMR) WRITE HEAD WITH COMPENSATION FOR DC SHUNTING FIELD

CROSS-REFERENCE TO RELATED APPLICATIONS

This application is a continuation of co-pending U.S. patent application Ser. No. 16/276,466, filed Feb. 14, 2019, which application is a continuation of U.S. patent application Ser. No. 15/722,217, filed Oct. 2, 2017, now abandoned. Each of the aforementioned applications are herein incorporated by reference.

BACKGROUND

Field of the Invention

This invention relates generally to microwave-assisted magnetic recording (MAMR) wherein a spin-torque oscillator (STO) is incorporated into the write head.

Description of the Related Art

Perpendicular magnetic recording (PMR) in magnetic recording hard disk drives, wherein the recorded bits are stored in a perpendicular or out-of-plane orientation in the magnetic recording layer of the disk, allows for ultra-high recording density, i.e., the areal density of the recorded bits on the disk. However, an increase in recording density requires a corresponding reduction in the size of the magnetic grains in the magnetic recording layer to achieve sufficient medium signal-to-noise ratio. As the size of the magnetic grains is reduced, the magnetocrystalline anisotropy of the magnetic grains must be increased to maintain adequate thermal stability. Simultaneously, the magnetic write field from the write head has to exceed the coercivity of the magnetic recording layer to achieve saturation digital recording, resulting in a conflicted limitation on the anisotropy of the magnetic grains.

PMR systems have been proposed that use a spin-torque oscillator (STO) incorporated into the disk drive's conventional write head. DC current, with a current density J above a critical value $J_C$, is applied to the STO across the write pole and the trailing shield of the write head to cause a ferromagnetic layer in the STO to generate a high frequency oscillatory auxiliary magnetic field. This type of system is sometimes referred to as microwave-assisted magnetic recording (MAMR).

In one type of MAMR write head a ferromagnetic free layer or field generation layer (FGL) in the STO generates an oscillatory auxiliary magnetic field to the magnetic grains of the recording layer. The auxiliary field may have a frequency close to the resonance frequency of the magnetic grains in the recording layer to facilitate the switching of the magnetization of the grains at lower write fields from the conventional write head than would otherwise be impossible without assisted recording. Conversely, MAMR may be used to increase the coercivity of the magnetic recording layer above that which could be written to by a conventional PMR write head alone. The increase in coercivity allows for a reduction in the size of the magnetic grains and thus a corresponding increase in recording density. MAMR systems are described by J. G. Zhu et al., "Microwave Assisted Magnetic Recording", *IEEE Transactions on Magnetics*, Vol. 44, No. 1, January 2008, pp. 125-131; and in U.S. Pat. No. 7,982,996 B2 and U.S. Pat. No. 8,970,996 B2, both assigned to the same assignee as this application.

In one proposed MAMR system, the STO is located between the write pole and the trailing magnetic shield of the write head. The STO electrical circuitry is typically connected to the write pole and trailing shield which function as the electrodes. The STO is a multilayer film stack made up of two or more ferromagnetic layers separated by a nonmagnetic electrically-conducting spacer layer. One of the ferromagnetic layers, called the field generation layer (FGL) or free layer, is designed to have its magnetization orientation oscillate or precess in the presence of STO current perpendicular to the film planes. Another ferromagnetic layer, the polarizer or spin-polarizing layer (SPL), is designed to supply spin-polarized electrons to the free layer in the presence of the STO current. The STO electrical circuitry supplies DC current to the STO. The electrons become polarized when reflected by the SPL, which creates the spin transfer torque on the magnetization of the free layer. This destabilizes the static equilibrium of the free layer's magnetization orientation, causing it to undergo sustained oscillation. If the oscillation frequency is near the resonance frequency of the magnetic grains in the recording layer, the switching of the magnetization of the grains will occur at a lower write field from the conventional write head.

SUMMARY

However, during operation of the STO the free layer also produces a DC shunting field component that opposes the write field in the gap between the write pole and the trailing shield. This DC shunting field is undesirable because it reduces the write field acting on the recording layer.

In embodiments of this invention a ferromagnetic compensation layer compensates for the DC shunting field from the free layer. The compensation layer is separated from the free layer by a nonmagnetic barrier layer. The nonmagnetic barrier layer prevents spin-polarized electrons from the free layer from applying a spin torque to the magnetization of the compensation layer. In one embodiment the compensation layer is located between the write pole and the free layer, with a nonmagnetic spacer layer between the write pole and the compensation layer, and the electron flow is from the trailing shield through the SPL, free layer and compensation layer to the write pole. An optional ferromagnetic reference layer may be ferromagnetically coupled to the write pole and located between the write pole and the spacer layer. During electron flow the barrier layer prevents spin-polarized electrons from the free layer from reaching the compensation layer. Electrons become spin-polarized by the compensation layer and are reflected back from the write pole (or the optional reference layer) across the spacer layer. This causes the magnetization of the compensation layer to flip and become antiparallel to the magnetization of the free layer. The compensation layer thus generates a DC offset field that is parallel to the write gap field and thus compensates for the negative effect of the DC shunting field from the free layer.

For a fuller understanding of the nature and advantages of the present invention, reference should be made to the following detailed description taken together with the accompanying figures.

DETAILED DESCRIPTION

Figure 1:
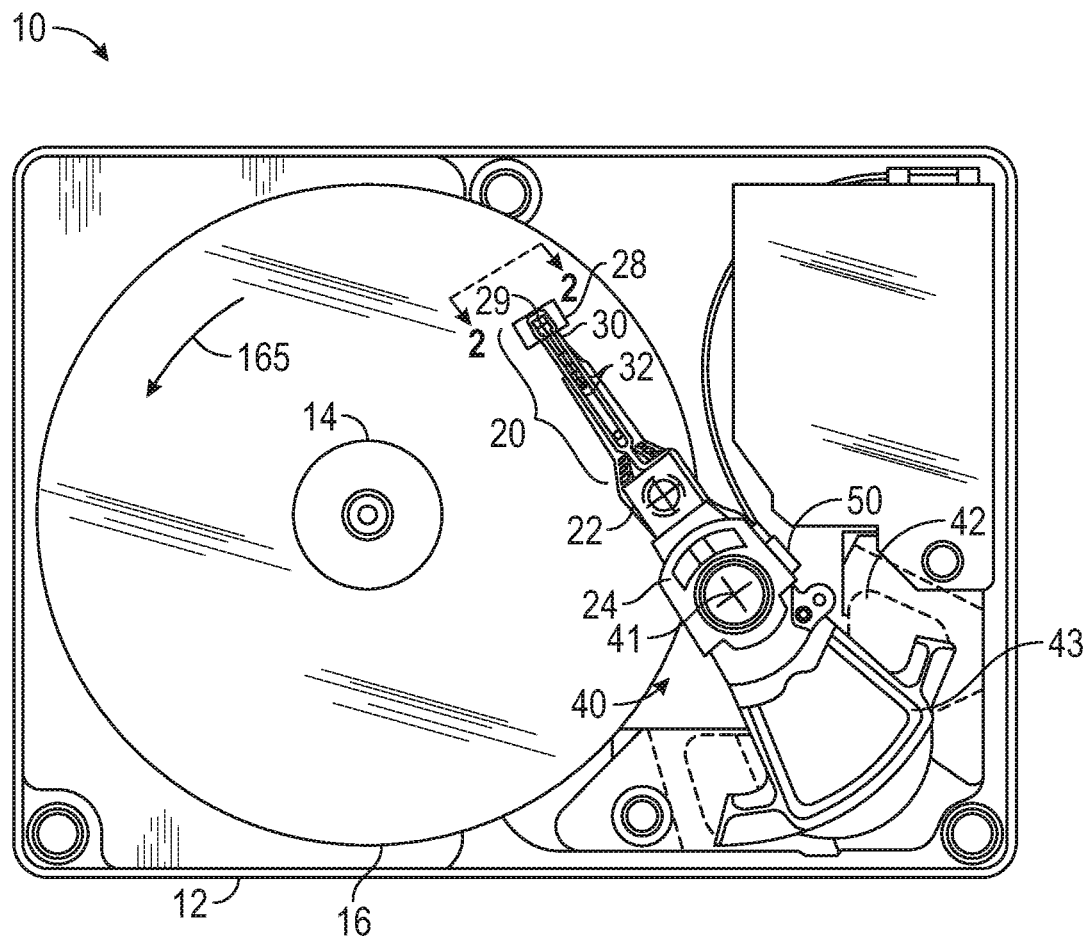
FIG. 1 is a top plan view of a conventional head/disk assembly of a hard disk drive with the cover removed that may function as a microwave-assisted magnetic recording (MAMR) disk drive.

FIG. 1 is a top plan view of a conventional head/disk assembly of a hard disk drive with the cover removed that may function as a microwave-assisted magnetic recording (MAMR) disk drive. The disk drive 10 includes a rigid base 12 supporting a spindle 14 that supports a stack of disks, including top disk 16. The spindle 14 is rotated by a spindle motor (not shown) for rotating the disks in the direction indicated by arrow 165. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to a gas-bearing slider 28. A magnetic recording read/write head 29 is located at the end or trailing surface of slider 28. In embodiments of this invention the write head 29 will incorporate a spin-torque oscillator (STO) (not shown). The flexure 30 enables the slider 28 to "pitch" and "roll" on a gas-bearing (typically air or helium) generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2A:
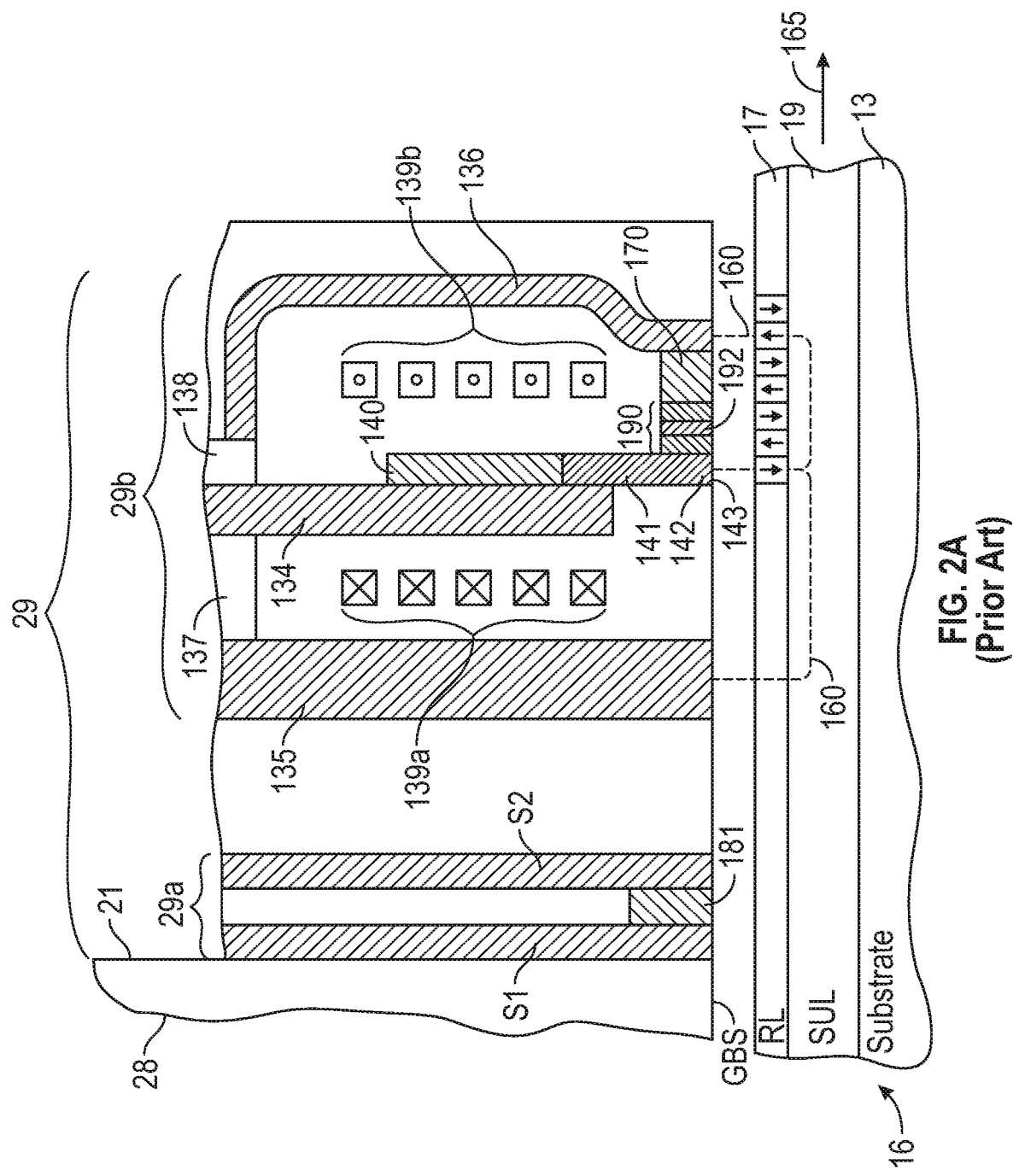
FIG. 2A is a side sectional view of a perpendicular write head with an incorporated spin-torque oscillator (STO) as proposed in the prior art, a read head and a recording disk taken through a central plane that intersects a data track on the disk.

FIG. 2A is a side sectional view of a perpendicular magnetic recording write head with an incorporated STO as proposed in the prior art, a read head and a recording disk taken through a central plane that intersects a data track on the disk. As shown in FIG. 2A, a "dual-layer" disk 16 includes a perpendicular magnetic data recording layer (RL) 17 on a "soft" or relatively low-coercivity magnetically permeable underlayer (SUL) 19 formed on the disk substrate 13. The read/write head 29 is formed on slider 28 and includes read head 29a and write head 29b. Read head 29a includes a magnetoresistive (MR) read element or sensor 181 located between two magnetic shields S1, S2. The write head 29b is a single write pole type of perpendicular magnetic recording (PMR) write head and includes a yoke structure with main pole 134, write pole 140, first flux return pole 135, second flux return pole 136, trailing magnetic shield 170, STO 190 between write pole 140 and trailing shield 170, and yoke studs 137, 138 connecting the main pole and return poles 135, 136 respectively. The write head 29b also includes a thin film coil 139a, 139b shown in section around main pole 134. The write coil 139a, 139b is a helical coil wrapped around main pole 134, but the write coil may also be a conventional dual "pancake" coil in which all the coil sections are in substantially the same plane and wrapped around the yoke. A flared write pole (WP) 140 is part of the main pole 134 and has a flared portion 141 and a pole tip 142 with an end 143 that faces the outer surface of disk 16. Write current through coil 139a, 139b induces a magnetic field (shown by dashed line 160) from the WP 140 that passes through the RL 17 (to magnetize the region of the RL 17 beneath the WP 140), through the flux return path provided by the SUL 19, and back to the ends 35a, 36a of return poles 135, 136, respectively.

The read/write head 29 is typically formed as a series of thin films deposited on a trailing surface 21 of gas-bearing slider 28 that has its gas-bearing surface (GBS) supported above the surface of disk 16. The MR read head 29a is comprised of MR sensor 181 located between MR shields S1 and S2 and is deposited on the trailing end 21 of the slider 28 prior to the deposition of the layers making up the write head 29b. In FIG. 2A, the disk 16 moves past the write head 29b in the direction indicated by arrow 165, so the portion of slider 28 that supports the read head 29a and write head 29b is often called the slider "trailing" end, and the surface 21 perpendicular to the slider GBS on which the write head 29b is located is often called the slider "trailing" surface.

The RL 17 is illustrated with perpendicularly recorded or magnetized regions, with adjacent regions having opposite magnetization directions, as represented by the arrows. The magnetic transitions between adjacent oppositely-directed magnetized regions are detectable by the MR sensor 181 as the recorded bits.

FIG. 2A also illustrates a trailing shield (TS) 170 spaced from WP 140. The TS 170 is formed of ferromagnetic material. The STO 190 is located between WP 140 and TS 170. The STO 190 includes a ferromagnetic layer 192 whose magnetization precesses in the presence of DC current from electrical circuitry (not shown) connected to the WP 140 and the TS 170. A seed layer (not shown) is typically located between the WP 140 and the STO 190 and a capping layer (not shown) may be located between STO 190 and TS 170.

Figure 2B:
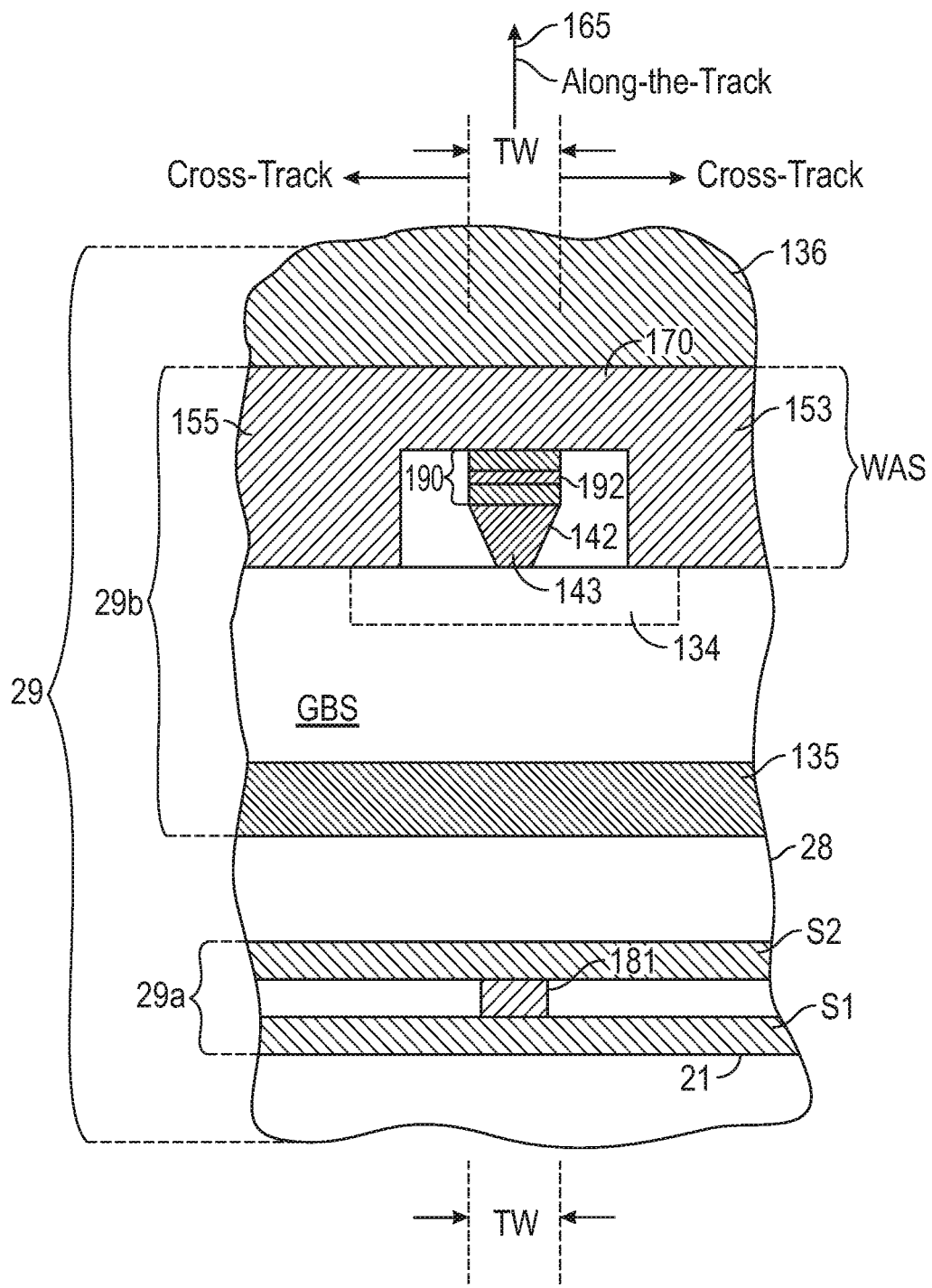
FIG. 2B is a view of the read/write head of FIG. 2A as seen from the disk.

FIG. 2B illustrates the read/write head 29 as seen from the disk 16. The GBS is the recording-layer-facing surface of the slider 28 that faces the disk 16 (FIG. 2A) and is shown without the thin protective overcoat typically present in an actual slider. The recording-layer-facing surface shall mean the surface of the slider 28 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The disk 16 (FIG. 2A) moves relative to the read/write head 29 in the direction 165, which is called the along-the-track direction. The direction perpendicular to direction 165 and parallel to the plane of the GBS is called the cross-track direction. The width of the end 143 of WP tip 142 in the cross-track direction substantially defines the track-width (TW) of the data tracks in the RL 17 (FIG. 2A).

The main pole 134 is shown with dashed lines because it is recessed from the GBS (see FIG. 2A).

The portions identified as 153, 155 on opposite ends of TS 170 are side shields that together with TS 170 form a wraparound shield (WAS) that generally surrounds the WP tip 142. The shields 170, 153, 155 all have ends substantially at the recording-layer-facing surface. The shields 170, 153, 155 are formed as a single-piece structure to form the WAS that substantially surrounds the WP tip 142 and are thus formed of the same material, typically a NiFe, CoFe or NiFeCo alloy, so that they have the same alloy composition. The side shields 153, 155 are separated from WP tip 142 by nonmagnetic gap material. The STO 190 is located between the WP tip 142 and the TS 170. The WAS alters the angle of the write field and improves the write field gradient at the point of writing, and also shields the writing field at regions of the RL away from the track being written. The WAS is shown as connected to the return pole 136. However, the WAS may be a "floating" WAS shield not connected to either the return pole 136 or other portions of the yoke by flux-conducting material. Also, instead of a WAS, the write head 29b may have separate side shields not connected to the TS 170.

Figure 3:
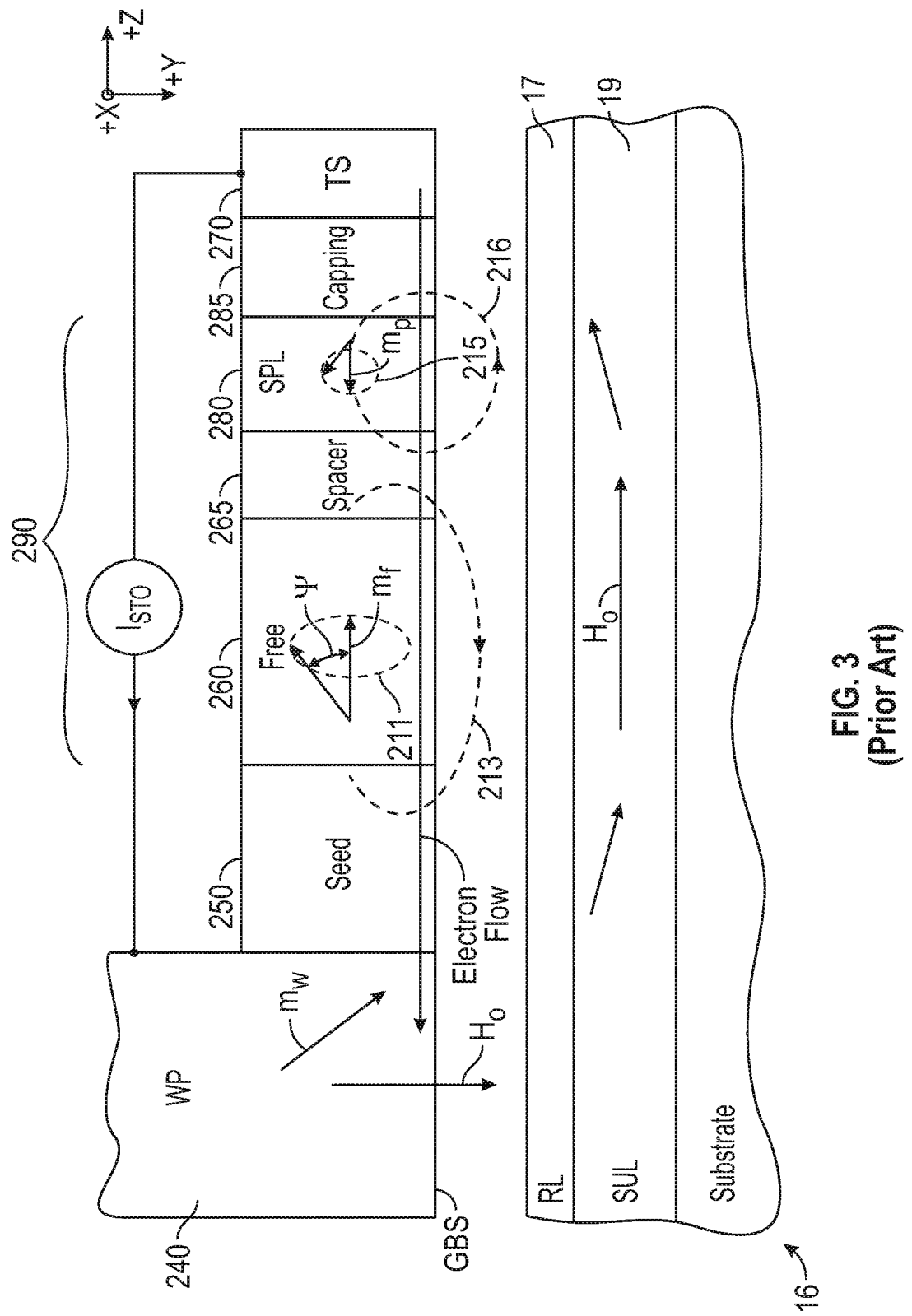
FIG. 3 is a side sectional view of one type of conventional microwave-assisted magnetic recording (MAMR) write head.

FIG. 3 is a side sectional view of one type of conventional MAMR write head with a spin-torque oscillator (STO) 290. During writing, the STO electrical circuitry provides DC current $I_{STO}$ between the WP 240 and the TS 270. The electron flow, by convention, is in the opposite direction from the TS 270 to the WP 240. The WP 240 has a magnetization ($m_w$) and is depicted as generating a write field ($H_0$) perpendicularly into the RL 17. The STO's ferromagnetic field generation layer (FGL) or free layer 260 has an edge substantially at the GBS and has a magnetization ($m_f$). Free layer 260 may be formed of high moment ferromagnetic materials such as CoFe alloys. A nonmagnetic electrically-conducting seed layer 250 is located between the WP 240 and free layer 260 to facilitate proper crystalline growth of free layer 260. The seed layer 250 may have a short spin diffusion length, i.e., the length over which the polarization of the electron current is destroyed owing to spin flip scattering. Seed layer 250 may be formed of a layer or multilayer of metals or metal alloys like Cu, Cr, Ta, Ru, Hf and Nb. The spin-polarizing layer (SPL) 280 is formed of ferromagnetic alloys such as NiFe or CoFe or Heusler alloys with no or very small perpendicular-to-the-plane magnetic anisotropy and low magnetic moment. SPL 280 has a magnetization ($m_p$). A nonmagnetic spacer layer 265 is located between the free layer 260 and the SPL 280. The nonmagnetic spacer layer 265 is typically formed of a material with a long spin-diffusion length, like Cu or other materials like Au, Ag or AgSn. A nonmagnetic electrically-conducting capping layer 285 may be located between SPL 280 and TS 270. The capping layer 285 may be formed of a layer or multilayer of metals or metal alloys like Ru, Ir, Ta and Ti. The stack of layers between the WP 240 and TS 270 are formed on the slider body after the write pole 240 is formed, using conventional deposition and lithographic techniques well-known in the fabrication of thin film read/write heads.

In the absence of DC current ($I_{STO}$), the magnetizations $m_f$ and $m_p$ are both parallel to the write field $H_0$ in the gap between WP 240 and TS 270. In operation of the STO 290, DC current ($I_{STO}$), with a current density J above a critical value $J_C$, is applied across the WP 240 and the TS 270. The flow of electrons is from the TS 270 through SPL 280 to free layer 260. The electrons become spin polarized by SPL 280 and apply a direct spin torque on free layer 260. Spin-polarized electrons are reflected by the free layer 260 and apply a torque on the magnetization $m_p$ of SPL 280, which causes $m_p$ to flip and become oriented antiparallel to the write gap field. The direct and reflected spin-polarized electrons apply a spin torque on the magnetization $m_f$ of the free layer 260 and the magnetization $m_p$ of SPL 280. This induces a precessional motion of the magnetization $m_f$ of free layer 260 and the magnetization $m_p$ of SPL 280. The rotation of the SPL 280 magnetization $m_p$ about the Z-axis is depicted by the oval 215 that represents a circular precessional motion of the tip of the magnetization vector $m_p$ lying in a plane parallel to the X-Y plane. The free layer 260 magnetization $m_f$ makes an angle ψ with the X-Y plane and has a component in the X-Y plane that rotates at an azimuthal angle about the Z-axis with a certain frequency f. The rotation of the free layer 260 magnetization $m_f$ about the Z-axis at this approximately fixed angle ψ is depicted by the oval 211 that represents a circular precessional motion of the tip of the magnetization vector $m_f$ lying in a plane parallel to the X-Y plane. The frequency of precession depends on the properties and thicknesses of the materials making up the STO 290, but for a specific STO the frequency of precession is a function of the values of both $I_{STO}$ and $H_0$.

During writing, a write field $H_0$ in the write gap between the WP 240 and TS 270 is applied to the magnetic grains in the recording layer RL 17. At the same time the precession of the free layer 260 magnetization $m_f$ applies an auxiliary ac field to the magnetic grains. This results in microwave-assisted magnetic recording (MAMR), which improves the switching of the magnetization of the grains in the RL 17, with the improvement depending on the frequency f at which the auxiliary field is applied. As is well known in the art, ferromagnetic materials absorb energy from AC magnetic fields more efficiently at or near their ferromagnetic resonance frequency, as described in Kittel C., "On the Theory of Ferromagnetic Resonance Absorption", *Phys. Rev.* 73, pp. 155-161 (1948). Accordingly, the frequency f of the auxiliary magnetic field from the free layer 260 of the STO 290 is designed to be preferably within a range near the ferromagnetic resonance of the magnetic material making up the grains in the RL 17, e.g., about 30-50 GHz. As a result, the write field required from the conventional PMR write head can be reduced from what would be required to switch the magnetization of the grains in the RL 17 without MAMR. Conversely, MAMR may be used to increase the coercivity of the RL 17 above that which could be written to by a conventional PMR write head alone.

However, during operation the free layer 260 also produces a DC field component from magnetization $m_f$ that is proportional to ($B_s t$)cos ψ, where $B_s$ is the saturation magnetization, t is the thickness of the free layer and $B_s t$ is the magnetic moment of the free layer per unit area. This DC field is shown by arrow 213 and is undesirable because it is in the direction away from the WP 240 toward TS 270 and thus has a shunting effect on the write gap field $H_0$. While the SPL 280 produces a DC field component 216 that appears to offset or counteract the DC component 213 from free layer 260, this DC field is relatively small because SPL 280 has a relatively low magnetic moment ($B_s t$ is much less than the $B_s t$ of free layer 260). When write current from the coil is switched, the write gap field $H_0$ is switched from the direction into the RL (as depicted in FIG. 3) to out of the RL, which results in a switching of directions of the magnetizations $m_w$, $m_p$ and $m_f$, as well as the direction of DC shunting field 213.

Figure 4A:
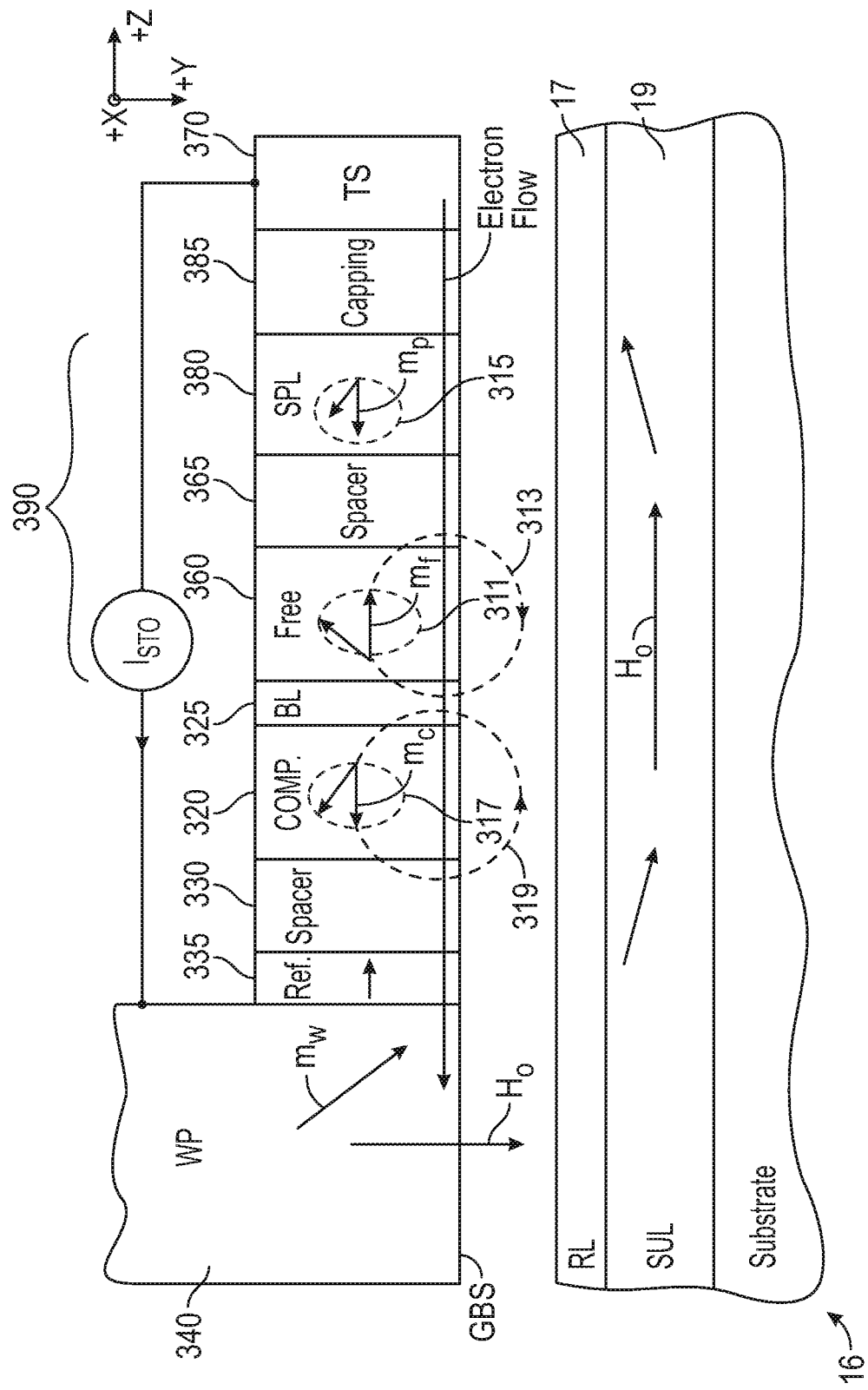
FIG. 4A is a side sectional view of a MAMR write head with a STO according to an embodiment of the invention.

FIG. 4A is a side sectional view of a MAMR write head with a spin-torque oscillator (STO) 390 according to an embodiment of the invention. During writing, the STO electrical circuitry provides DC current ($I_{STO}$) between the WP 340 and the TS 370. The electron flow, by convention, is in the opposite direction from the TS 370 to the WP 340. In this embodiment a ferromagnetic compensation layer 320, with a magnetization $m_c$, for compensating the DC shunting field 313 from free layer 360 is located between WP 340 and free layer 360. The compensation layer 320 may be formed of high moment ferromagnetic materials such as CoFe alloys, like those for free layer 360. The compensation layer 320 is separated from free layer 360 by a nonmagnetic barrier layer (BL) 325. BL 325 may have a short spin diffusion length to assure that no spin-polarized electrons from free layer 360 will apply a spin torque to the magnetization of compensation layer 320. Suitable materials for BL 325 include Ru, Ir, Ta, and NiCr. A nonmagnetic spacer layer 330, which is like STO spacer layer 365 in having a typically long spin-diffusion length, is located between WP 340 and compensation layer 330. An optional ferromagnetic reference layer 335 may be ferromagnetically coupled to WP 340 and thus located between WP 340 and spacer layer 330. Reference layer 335 has a high $B_s t$ and provides spin-polarized electrons that apply a spin torque to the magnetization of compensation layer 330. Reference layer 335 may be formed of CoFe or Heusler alloys, for example.

In the absence of DC current ($I_{STO}$), the magnetizations $m_c$, $m_f$, $m_p$ and the magnetization of reference layer 335 are all parallel to the write gap field $H_0$. In operation of the STO 390, DC current ($I_{STO}$), with a current density J above a critical value $J_C$, is applied across the WP 340 and the TS 370. The flow of electrons is from the TS 370 through the SPL 380 to free layer 360. The operation of STO 390 is substantially the same as described above for STO 290 in FIG. 3. However, BL 325 prevents spin-polarized electrons from reaching compensation layer 320. Electrons become spin-polarized by compensation layer 320 and are reflected back from WP 340 (or optional reference layer 335) across spacer layer 330, which causes $m_c$ to flip and become substantially antiparallel to the write gap field $H_0$ and thus antiparallel to $m_f$. The reflected electrons apply a spin torque to $m_c$, which causes it to precess, as depicted by the oval 317 that represents a circular precessional motion of the tip of the magnetization vector $m_c$ lying in a plane parallel to the X-Y plane. Because $m_c$ is opposite the write gap field $H_0$, the cosine of the precession angle of $m_c$ is negative (while the cosine of the precession angle of $m_f$ is positive). Thus the frequency of precession of $m_c$ is much higher than the frequency of precession of $m_f$ and the resonant frequency of the magnetic grains in RL 17. This can be understood by observing the effect of the cosine function on frequency from the well-known Kittel equation:

$$f=1/2\pi\gamma(\mu_0 H_0-\mu_0 M_s \cos \psi),$$

where $M_s$ is the saturation magnetization, $\psi$ is the precession angle and $\gamma$ is the gyromagnetic ratio for the electrons. Thus the compensation layer 320 does not affect the magnetic grains and there is no microwave assistance from compensation layer 320. However, the precessing $m_c$ of compensation layer 320 provides a DC field 319 that is substantially parallel to the write gap field $H_0$ and thus compensates for the negative effect of the DC shunting field 313 from free layer 360. When write current from the coil is switched, the write gap field $H_0$ is switched from the direction into the RL (as depicted in FIG. 4A) to out of the RL, which results in a switching of directions of the magnetizations $m_w$, $m_p$, $m_f$ and the magnetization of reference layer 335, as well as the direction of DC shunting field 313 and DC compensation field 319.

Figure 4B:
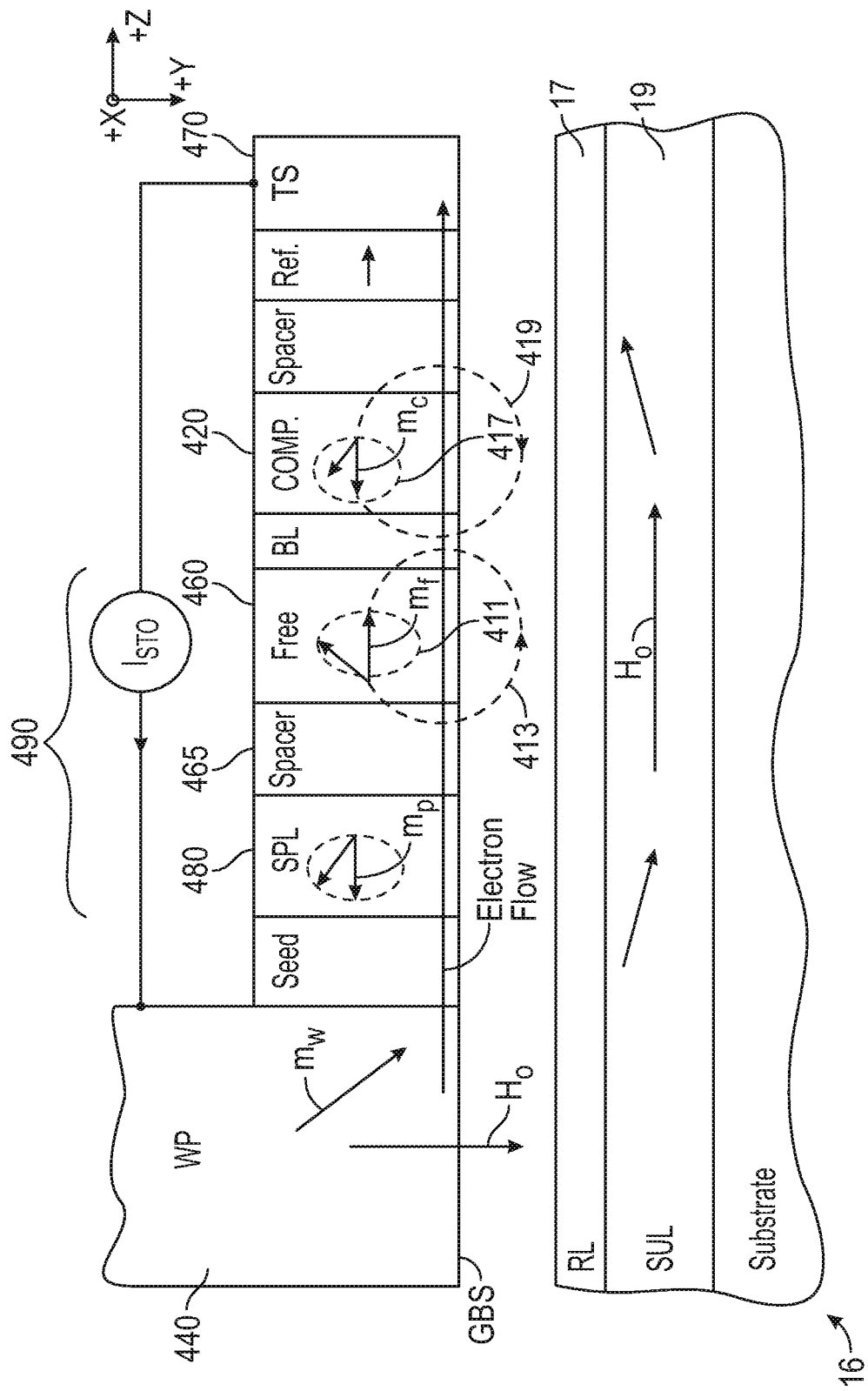
FIG. 4B is a side sectional view of a MAMR write head with a STO according to an alternative embodiment of the invention.

FIG. 4B is a side sectional view of a MAMR write head with a spin-torque oscillator (STO) 490 according to an alternative embodiment of the invention. This embodiment functions in substantially the same manner as the embodiment of FIG. 4A to compensate for the DC shunting field from the free layer. However, in this embodiment the SPL 480 and free layer 460, which are separated by spacer layer 465, are switched in position so that SPL 480 is nearer WP 440. A nonmagnetic seed layer is located between the write pole and the SPL 480. The compensation layer 420 is located between free layer 460 and TS 470. The DC current ($I_{STO}$) direction is also switched so that electron flow is directed first to SPL 480 (as it is in the embodiment of FIG. 4A). In operation, the compensation layer 420 provides a DC field 419 that is substantially parallel to the write gap field $H_0$. The DC field 419 is an offset field or compensation field that offsets at least a portion of the DC shunting field 413 from free layer 460.

Figure 5:
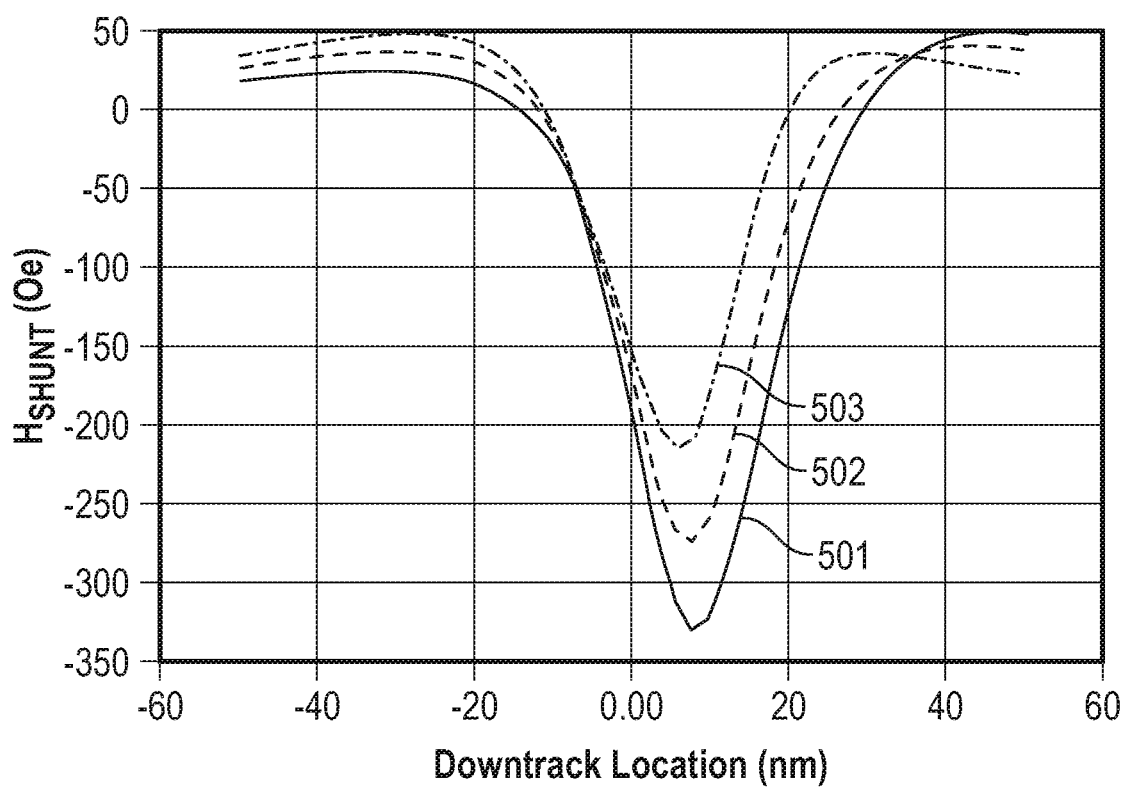
FIG. 5 is a graph generated by micromagnetic computer modeling of net DC shunting field ($H_{shunt}$) as a function of downtrack location for a MAMR write head without a DC field compensation layer and for a MAMR write head with different DC field compensation layers.

FIG. 5 is a graph generated by micromagnetic computer modeling of net DC shunting field ($H_{shunt}$) as a function of downtrack location. In this model there is no applied write field, so $H_{shunt}$ is the net field measured 15 nm below the MAMR write head's GBS at the center of the recording layer (RL 17 in FIGS. 3, 4A and 4B). The SPL had a $B_s$ of 0.6 Tesla (T) and a thickness of 2 nm and the free layer had a $B_s$ of 2.0 T and a thickness of 5 nm. On the downtrack axis the origin 0.0 is the position at the edge of the SPL.

Curve 501 is for a MAMR write head with no DC field compensation layer and shows that at 10 nm downtrack (which is approximately at the middle of the free layer) the net DC shunting field (essentially the field represented by curve 213 in FIG. 3) is about −330 Oe. This is the undesirable field that acts against the write gap field.

Curve 502 is for the same MAMR write head but with a DC field compensation layer having a $B_s$ of 0.6 T and a thickness of 3 nm and shows that at approximately 10 nm downtrack the net DC shunting field (the difference between the field 413 from the free layer and the field 419 from the compensation layer in FIG. 4B) is about −270 Oe. The compensation layer has offset the negative effect of the DC shunting field by about 70 Oe. Curve 503 is for the same MAMR head but with a DC field compensation layer having a $B_s$ of 1.3 T and a thickness of 3 nm. Curve 503 shows that increasing the $B_s$ of the compensation layer results in a reduction of the net DC shunting field by about 130 Oe. The modeling shows that increasing the $B_s$ and/or the thickness of the compensation layer will result in further reductions in the DC shunting field from the free layer.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording write head for magnetizing regions in a magnetic recording layer, the write head comprising:
   a write pole;
   a trailing shield;
   a spin torque oscillator (STO) between the write pole and the trailing shield;

an electrically conductive coil coupled to the write pole for generating a magnetic write field between the write pole and the trailing shield;
a ferromagnetic compensation layer for offsetting a shunting field;
a nonmagnetic barrier layer between the compensation layer and the STO; and
a nonmagnetic spacer layer adjacent the compensation layer, the compensation layer being located between the spacer layer and the barrier layer.

2. The head of claim 1 wherein the write head is adapted for electron flow in the direction from the trailing shield to the write pole and the compensation layer is between the write pole and the STO.

3. The head of claim 2 further comprising a ferromagnetic reference layer ferromagnetically coupled to the write pole and located between the write pole and the spacer layer.

4. The head of claim 1 wherein the write head is adapted for electron flow in the direction from the write pole to the trailing shield and the compensation layer is between the trailing shield and the STO.

5. The head of claim 4 further comprising a ferromagnetic reference layer ferromagnetically coupled to the trailing shield and located between the trailing shield and the spacer layer.

6. The head of claim 1 wherein the STO comprises a spin-polarizing layer adapted to have its magnetization flip to be substantially antiparallel to the magnetization of a free layer in the presence of electron flow and a write field.

7. The head of claim 1 wherein the compensation layer has a magnetization, the compensation layer being adapted to have its magnetization flip to be substantially antiparallel to the magnetization of a free layer in the presence of electron flow.

8. The head of claim 1 wherein the STO comprises a free layer is adapted to provide microwave-assisted magnetic recording to the recording layer in the presence of current through STO electrical circuitry.

9. A magnetic recording system comprising:
the write head of claim 1; and
a magnetic recording medium having a magnetic recording layer.

10. A microwave-assisted magnetic recording (MAMR) write head for magnetizing regions of a magnetic recording layer, the head comprising:
a write pole;
a trailing shield;
an electrically conductive coil coupled to the write pole and capable of generating a magnetic write field between the write pole and the trailing shield;
a spin torque oscillator (STO) between the write pole and the trailing shield, the STO comprising a ferromagnetic field generation layer (FGL) having a magnetization, a ferromagnetic spin-polarizing layer (SPL) having a magnetization, and a first nonmagnetic spacer layer between the FGL and the SPL;
a ferromagnetic compensation layer between the write pole and the FGL;
a nonmagnetic barrier layer between the compensation layer and the FGL;
a second nonmagnetic spacer layer between the write pole and the compensation layer;
wherein the FGL is adapted to have its magnetization precess in the presence of electron flow to thereby provide microwave-assisted magnetic recording to the recording layer, the precessing FGL magnetization generating a DC shunting field that opposes the write field; and
wherein the compensation layer is adapted to have its magnetization flip to be substantially opposite the direction of FGL magnetization in the presence of electron flow to thereby generate a DC compensation field for offsetting said DC shunting field in the presence of electron flow.

11. The head of claim 10 further comprising a ferromagnetic reference layer ferromagnetically coupled to the write pole and located between the write pole and the second spacer layer.

12. A magnetic recording system comprising:
the write head of claim 10; and
a magnetic recording medium having a magnetic recording layer.

13. A microwave-assisted magnetic recording (MAMR) disk drive perpendicular recording write head for magnetizing regions in data tracks of a perpendicular magnetic recording layer on a disk, the head being formed on a slider having a gas-bearing surface (GBS) and comprising:
a substrate;
a write pole on the substrate and having an end substantially at the GBS;
a nonmagnetic spacer layer on the write pole;
a ferromagnetic compensation layer on the spacer layer and having a magnetization and an edge substantially at the GBS;
a nonmagnetic barrier layer on the compensation layer;
a spin torque oscillator (STO) comprising a ferromagnetic spin-polarizing layer (SPL);
a nonmagnetic capping layer on the SPL;
a trailing shield on the capping layer; and
an electrically conductive coil coupled to the write pole capable of generating a magnetic write field between the write pole and the trailing shield, wherein the compensation layer is adapted to have its magnetization flip to be substantially antiparallel to the magnetization of a free layer in the presence of electron flow, the compensation layer generating a compensation field.

14. The head of claim 13 further comprising a ferromagnetic reference layer ferromagnetically coupled to the write pole and located between the write pole and the STO.

15. The head of claim 13 wherein the spin-polarizing layer has a magnetization, the spin-polarizing layer being adapted to have its magnetization flip to be substantially antiparallel to the magnetization of a free layer in the presence of electron flow and a write field.

16. The head of claim 13 wherein the STO includes a free layer that is adapted to provide microwave-assisted magnetic recording to the recording layer in the presence of current through STO electrical circuitry.

17. A magnetic recording disk drive comprising:
the write head of claim 13; and
a magnetic recording disk having a perpendicular magnetic recording layer.

* * * * *